United States Patent [19]
Biller

[11] Patent Number: 5,906,396
[45] Date of Patent: May 25, 1999

[54] VERTICAL ADJUSTER FOR A DEFLECTION FITTING OF A VEHICLE SAFETY BELT

[75] Inventor: Dieter Biller, Alfdorf-Brech, Germany

[73] Assignee: TRW Occupant Restraint Systems GmbH & Co. KG, Alfdorf, Germany

[21] Appl. No.: 09/083,354

[22] Filed: May 22, 1998

[30] Foreign Application Priority Data

May 23, 1997 [DE] Germany ............ 297 09 121 U

[51] Int. Cl.⁶ ............................................. B60R 22/28
[52] U.S. Cl. .................... 280/801.2; 280/748; 280/808
[58] Field of Search ............................. 280/801.2, 805, 280/808, 748, 751; 297/468, 483, 472

[56] References Cited

U.S. PATENT DOCUMENTS 5,464,252  11/1995  Kanazawa et al. ............ 297/472
5,529,344  6/1996  Yasui et al. .................. 280/808
5,791,687  8/1998  Gotou et al. ................. 280/808

FOREIGN PATENT DOCUMENTS

4405106A1  8/1994  Germany.

Primary Examiner—Eric D. Culbreth
Attorney, Agent, or Firm—Tarolli, Sundheim, Covell, Tummino & Szabo

[57] ABSTRACT

A vertical adjuster for a deflection fitting of a vehicle safety belt includes a rail with a base part. The rail has at least one fastening screw for being fastened to a vehicle body. The rail further includes a deformation element allowing a displacement of said rail relative to the fastening screw. The deformation element is arranged on a side of the base part which is facing away from the vehicle body when the rail is mounted thereon.

7 Claims, 3 Drawing Sheets

VERTICAL ADJUSTER FOR A DEFLECTION FITTING OF A VEHICLE SAFETY BELT

The invention relates to a vertical adjuster for a deflection fitting of a vehicle safety belt.

BACKGROUND OF THE INVENTION

A vertical adjuster typically comprises a rail which can be fastened to the vehicle body by at least one fastening screw, the rail being supported on the vehicle body by means of a deformation element.

The rail of such a vertical adjuster serves as a guide for a sliding carriage on which the deflection fitting for the safety belt is arranged so as to be vertically adjustable. Like other components in the interior of the vehicle, also the rail for the vertically adjustable deflection fitting must be constructed so as to be ductile, so that in the case of an impact of the head of a vehicle occupant, given threshold values are not exceeded, which are either predefined by the manufacturer or prescribed by law. By means of a plastic covering for the rail in particular, the forces acting in the case of a head impact can be reduced; for the case of a direct striking onto the deflection fitting, however, it is necessary for the rail to yield as a whole.

In U.S. Pat. No. 5,529,344, a vertical adjuster of the type initially mentioned is shown, the rail thereof being mounted displaceably at the vehicle body. With this known configuration, a pressure spring is arranged between the vehicle body and the rail. Accordingly, a comparatively large space is required for accommodation of the rail.

Therefore, the object of the invention is to provide a vertical adjuster in which the space for accommodation of the rail is small even though a large displacement path of the rail is ensured.

BRIEF DESCRIPTION OF THE INVENTION

According to the invention, a vertical adjuster for a deflection fitting of a vehicle safety belt comprises a rail with a base part. The rail has at least one fastening screw for being fastened to a vehicle body. The rail further comprises a deformation element allowing a displacement of said rail relative to the fastening screw. The deformation element is arranged on a side of the base part which is facing away from the vehicle body when the rail is mounted thereon.

This construction takes into account the following knowledge. For an optimum flexibility of the rail, it is advantageous if as large a deformation range as possible is available. Since a compact configuration is to be achieved, the structural conditions in particular on a B-column of a vehicle do not allow to enlarge the deformation range at will, because otherwise the deflection fitting would project excessively far into the interior of the vehicle. According to the invention, no deformation elements are situated between the vehicle body and the rail of the vertical adjuster, so that the space which is available can be used fully as a deformation range.

According to the preferred embodiment of the invention, provision is made furthermore that the rail is arranged so as to be displaceable on the fastening screw. With this construction, the fastening screw serves both as holding element for the rail and also as guide for the rail when the latter is moved relative to the automobile body.

Furthermore, provision can be made that on the fastening screw a spacer sleeve is arranged, on which the rail is displaceable. With this spacer sleeve, the deformation range can be predefined, which is available for a yielding of the rail in the case of an impact of a vehicle occupant.

Provision can also be made that the deformation element is arranged between the spacer sleeve and the head of the fastening screw. With this design, the rail can be provided as a pre-mounted unit together with the fastening screw, the spacer sleeve and the deformation element.

Preferably, provision is made that the rail is a hollow section and the deformation element is arranged inside the rail. With this construction, a particularly compact structural shape is produced on the one hand and an optimum introduction of force from the rail into the deformation element on the other hand.

According to a preferred embodiment, provision is made that the deformation element is constructed in a stirrup shape with a central cross-piece on which the fastening screw engages, and with two legs which engage on the rail. Such a deformation element can be manufactured comparatively simply, for example from steel, the deformation behavior being able to be adapted to the respective requirements by various constructions of the legs.

Further advantageous developments of the invention will be apparent from the sub-claims.

BRIEF DESCRIPTION OF THE DRAWINGS

The invention is described hereinbelow with reference to various embodiments which are illustrated in the enclosed drawings, in which:

FIG. 5 shows a perspective view of a first variant of a deformation element;

FIG. 6 shows a perspective view of a second variant of a deformation element; and FIG. 7 shows a perspective view of an end of the rail of a vertical adjuster according to the invention, with a deformation element according to a third variant.

DETAILED DESCRIPTION OF THE INVENTION

Figure 1:
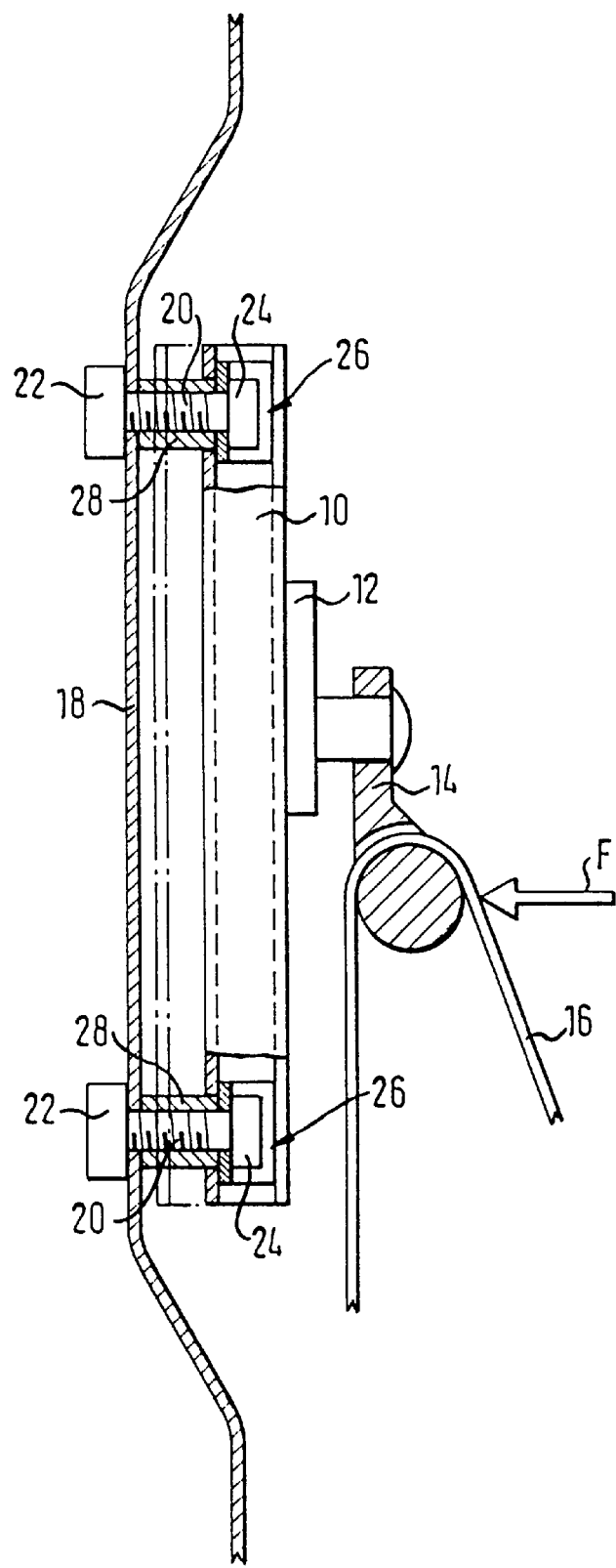
FIG. 1 shows a diagrammatic side view of a vertical adjuster according to the invention with a rail which is fastened to a part of the automobile body.

In FIG. 1, a vertical adjuster according to the invention is illustrated with a rail 10 in which a sliding carriage 12 is arranged so as to be displaceable, on which a deflection fitting 14 for a vehicle safety belt 16 is arranged. The rail 10 is fastened to a vehicle body part 18 of the car body, for example a B-column of a vehicle. The rail is a hollow section which is open on the side facing away from the vehicle body part, so that access to the siding carriage 12 is possible.

For fastening the rail 10, a fastening screw 20 is used (see also FIGS. 2 and 3), which is screwed into a counterpart 22 on the vehicle body part 18. A deformation element 26 and a spacer sleeve 28 are arranged between the head 24 of the screw 20, lying inside the rail 10, and the counterpart 22. The rail is provided with an opening 30, the internal diameter of which is slightly greater than the external diameter of the spacer sleeve 28. The rail is therefore displaceable thereon.

Figure 2:
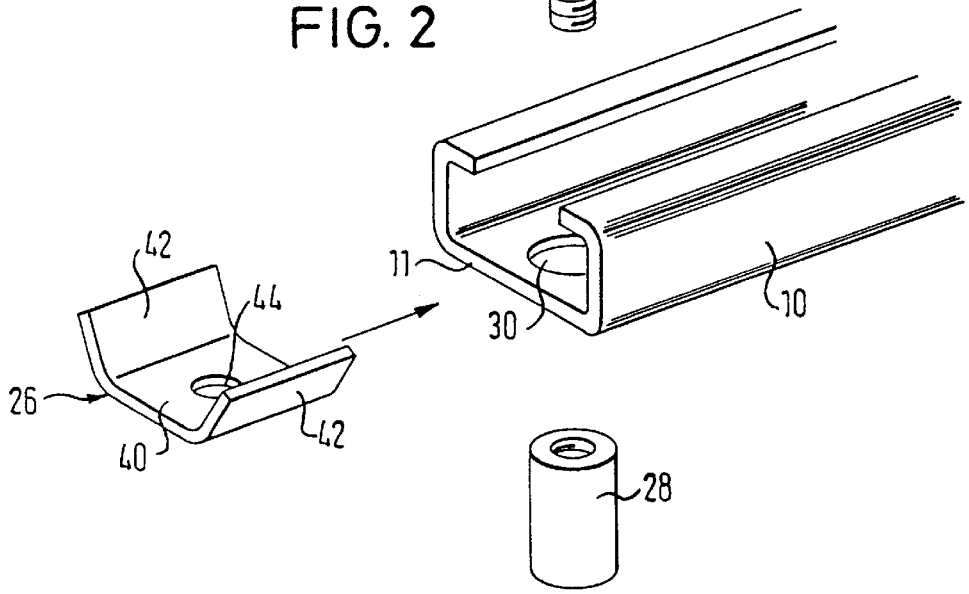
FIG. 2 shows a perspective view of an end of the rail of a vertical adjuster according to the invention.
Figure 3:
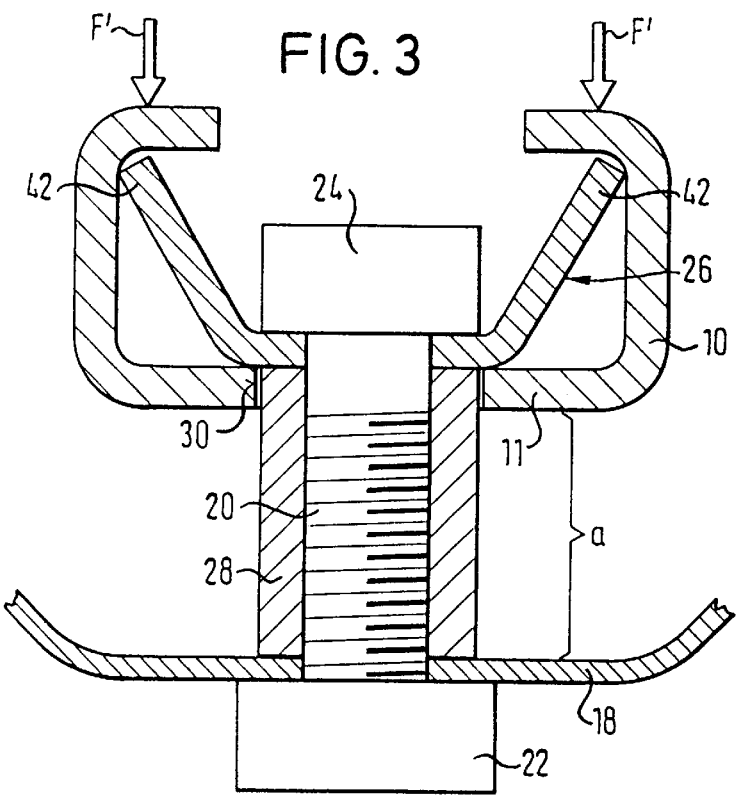
FIG. 3 shows a cross-section through the rail of a vertical adjuster according to the invention, in the initial state.

As can be seen in particular in FIG. 2, the deformation element 26 is constructed in a stirrup shape with a central cross-piece 40 and two legs 42. In the central cross-piece, a bore 44 is provided for the fastening screw 20. As can be seen in particular in FIG. 3, the deformation element 26 is arranged inside the rail 10 so as to hold it in an initial position at a distance from the vehicle body part 18 in the vicinity of the head 24 of the fastening screw 20. Thus, a distance a results between the vehicle body part 18 and the rail 10, which is available as deformation way.

Figure 4:
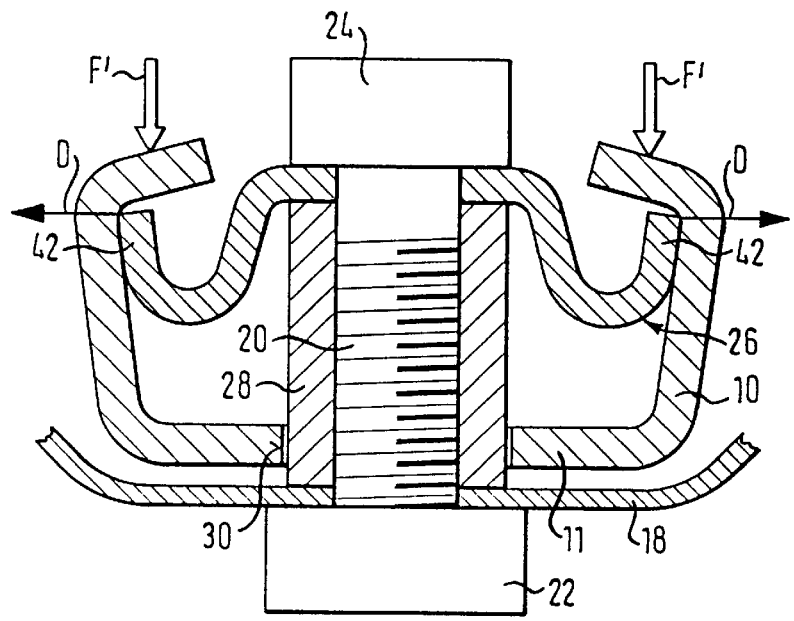
FIG. 4 shows a cross-section through the rail of a vertical adjuster according to the invention, with deformed deformation element.

If an impact of the vehicle occupant occurs, for example, on the deflection fitting, a force is introduced therein along the arrow F of FIG. 1. This force is introduced via the sliding carriage 12 into the rail 10 and materializes at the end of the rail 10, illustrated in FIGS. 3 and 4, as two partial forces F', which act on each side of the rail. These forces are introduced via the free outer ends of the legs 42, which abut against the rail, into the deformation element 26 and then via the spacer sleeve 28 into the vehicle body part 18. If a critical load of the deformation element 26 is exceeded, which is predefined by design, a plastic deformation occurs, as is illustrated in FIG. 4. During this deformation, the rail 10 is moved towards the vehicle body part 18, the entire distance a being available as deformation way. Owing to the plastic deformation of the deformation element 26, energy is converted, so that a slight stress on the vehicle occupant hitting the deflection fitting results. Depending on the selected construction for the deformation element 26, also a plastic deformation of the rail 10 occurs, owing to the forces transferred thereon by the deformation element. This is likewise illustrated in FIG. 4, the forces transferred by the deformation element 26 onto the rail 10 being symbolized by means of arrows D.

In FIG. 5, a first variant of the deformation element 26 is illustrated. It differs from the deformation element illustrated in FIGS. 1 to 4 in that a bend 50 is provided at the free outer end of the legs 42. This bend reduces the critical load, starting from which a plastic deformation of the deformation element occurs.

In FIG. 6, a second variant of the deformation element 26 is illustrated. The deformation element 26 which is shown differs from the deformation element illustrated in FIG. 5 in that the width of the legs 42 is reduced towards the exterior, starting from the central cross-piece 40. As a result of this construction, the critical load, starting from which a plastic deformation of the deformation element 26 occurs, is further reduced, the resistance to a deformation rising with increasing deformation, because the material which is to be deformed increases corresponding to the increase in width of the legs 42.

In FIG. 7, a third variant of the deformation element 26 is illustrated. The deformation element 26 which is shown differs from the deformation element of FIG. 2 by two tongues 70 which are provided on the free outer ends of the legs 42. These tongues are inserted into suitable openings 72 which are provided in the rail.

Basically any material which permits the necessary plastic deformation is suitable as material for the deformation element 26. In particular, the use of steel suggests itself. This material also offers a sufficient strength for the loads which occur on restraining the vehicle occupant by means of the safety belt 16 and which act on the deformation element 26, because the latter is not only stressed when a vehicle occupant hits the rail or the deformation fitting, but also in the case of tractive loads acting on the rail, since it lies in the force flow path between the vehicle body part and the rail 10.

I claim:

1. A vertical adjuster for a deflection fitting of a vehicle safety belt, comprising a rail with a base part, said rail having at least one fastening screw for being fastened to a vehicle body, and a deformation element allowing a displacement of said rail relative to said fastening screw, said deformation element being arranged on a side of said base part which is facing away from said vehicle body when said rail is mounted thereon, a spacer sleeve being arranged on said fastening screw, said rail being displaceable on said spacer sleeve.

2. The vertical adjuster of claim 1, wherein said deformation element is fastened between said spacer sleeve and a head of said fastening screw.

3. The vertical adjuster of claim 1, wherein said rail is a hollow section and said deformation element is arranged within said rail.

4. A vertical adjuster for a deflection fitting of a vehicle safety belt, comprising a rail with a base part, said rail having at least one fastening screw for being fastened to a vehicle body, and a deformation element allowing a displacement of said rail relative to said fastening screw, said deformation element being arranged on a side of said base part which is facing away from said vehicle body when said rail is mounted thereon, said deformation element being constructed with a central cross-piece on which said fastening screw engages, and with two legs which engage on the rail.

5. The vertical adjuster of claim 4, wherein said legs of said deformation elements each have a free outer end and wherein a bend is provided on each of said free outer ends.

6. The vertical adjuster of claim 5, wherein the width of said legs decreases outwards from said central cross-piece.

7. The vertical adjuster of claim 4, wherein a tongue is provided at each of said free outer ends of said legs, each of said tongues engaging into an opening provided at said rail.

* * * * *